(12) United States Patent
Marino et al.

(10) Patent No.: US 9,753,586 B2
(45) Date of Patent: Sep. 5, 2017

(54) MULTI-TOUCH TOUCH DEVICE WITH MULTIPLE DRIVE FREQUENCIES AND MAXIMUM LIKELIHOOD ESTIMATION

(75) Inventors: Rachael P. Marino, Londonderry, NH (US); Richard A. Peterson, Jr., Chelmsford, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 1636 days.

(21) Appl. No.: 12/575,860

(22) Filed: Oct. 8, 2009

(65) Prior Publication Data

US 2011/0084857 A1    Apr. 14, 2011

(51) Int. Cl.
*G06F 3/044* (2006.01)

(52) U.S. Cl.
CPC .................... *G06F 3/044* (2013.01)

(58) Field of Classification Search
USPC ................ 345/173; 341/5; 178/18.01–18.06
See application file for complete search history.

(56) References Cited

U.S. PATENT DOCUMENTS

| | | | |
|---|---|---|---|
| 3,732,369 A | 5/1973 | Cotter | |
| 4,071,691 A | 1/1978 | Pepper, Jr. | |
| 4,175,239 A | 11/1979 | Sandler | |
| 4,323,829 A | 4/1982 | Witney et al. | |
| 4,581,483 A | 4/1986 | Ralston | |
| 4,639,720 A | 1/1987 | Rympalski et al. | |
| 4,686,332 A | 8/1987 | Greanias et al. | |
| 5,006,952 A * | 4/1991 | Thomas | ...................... 361/283.2 |
| 5,189,417 A | 2/1993 | Caldwell et al. | |
| 5,305,017 A | 4/1994 | Gerpheide | |

(Continued)

FOREIGN PATENT DOCUMENTS

| | | |
|---|---|---|
| EP | 178157 | 4/1986 |
| FR | 2774497 | 8/1999 |

(Continued)

OTHER PUBLICATIONS

Analog Devices AD7142/AD7142-1, Rev. PrD, "Programmable Capicatance-to-Digital Converter with Environmental Compensation", 2005 Analog Devices, Inc., pp. 1-64.

(Continued)

*Primary Examiner* — Nicholas Lee
(74) *Attorney, Agent, or Firm* — Robert S. Moshrefzadeh (57) ABSTRACT

A touch-sensitive device includes a touch panel, drive unit, and measurement unit. A touch applied to a given node of the panel changes a capacitive coupling between a given drive and sense electrode of the touch panel. The drive unit delivers first and second drive signals, having different first and second frequencies, to first and second drive electrodes respectively at the same or overlapping times. The measurement unit receives a first response signal from a sense electrode, and analyzes the signal using maximum likelihood estimation to determine the coupling capacitance between the first drive electrode and the sense electrode, and between the second drive electrode and the sense electrode. More drive electrodes, including in some cases all the drive electrodes, can be driven with unique drive frequencies, and more sense electrodes, including in some cases all the sense electrodes, can be sensed by the measurement unit.

20 Claims, 6 Drawing Sheets

(56) References Cited

U.S. PATENT DOCUMENTS

| | | | |
|---|---|---|---|
| 5,349,353 | A | 9/1994 | Zrilic |
| 5,374,787 | A | 12/1994 | Miller et al. |
| 5,488,204 | A | 1/1996 | Mead et al. |
| 5,526,294 | A * | 6/1996 | Ono et al. .................... 708/143 |
| 5,572,205 | A | 11/1996 | Caldwell et al. |
| 5,730,165 | A | 3/1998 | Philipp |
| 5,790,106 | A | 8/1998 | Hirano et al. |
| 5,790,107 | A * | 8/1998 | Kasser et al. ................ 345/174 |
| 5,825,352 | A | 10/1998 | Bisset et al. |
| 5,861,583 | A | 1/1999 | Schediwy et al. |
| 5,867,111 | A | 2/1999 | Caldwell et al. |
| 5,920,309 | A | 7/1999 | Bisset et al. |
| 6,075,520 | A | 6/2000 | Inoue et al. |
| 6,239,389 | B1 | 5/2001 | Allen et al. |
| 6,452,514 | B1 | 9/2002 | Philipp |
| 6,466,036 | B1 | 10/2002 | Philipp |
| 6,535,200 | B2 | 3/2003 | Philipp |
| 6,879,930 | B2 * | 4/2005 | Sinclair et al. ............... 702/150 |
| 6,885,365 | B1 | 4/2005 | Kang |
| 6,888,536 | B2 | 5/2005 | Westerman |
| 6,970,160 | B2 | 11/2005 | Mulligan et al. |
| 7,129,714 | B2 | 10/2006 | Baxter |
| 7,148,704 | B2 | 12/2006 | Philipp |
| 7,265,746 | B2 | 9/2007 | Knowles |
| 7,274,353 | B2 | 9/2007 | Chiu et al. |
| 7,292,229 | B2 | 11/2007 | Morag et al. |
| 7,453,444 | B2 | 11/2008 | Geaghan |
| 7,830,157 | B2 | 11/2010 | Geaghan |
| 8,077,161 | B2 | 12/2011 | Kinoshita |
| 2001/0006369 | A1 * | 7/2001 | Ely ................................ 341/20 |
| 2003/0076306 | A1 | 4/2003 | Zadesky et al. |
| 2003/0122432 | A1 | 7/2003 | Caldwell |
| 2004/0004488 | A1 | 1/2004 | Baxter |
| 2004/0119701 | A1 | 6/2004 | Mulligan et al. |
| 2004/0178997 | A1 | 9/2004 | Gillespie et al. |
| 2005/0150697 | A1 | 7/2005 | Altman et al. |
| 2005/0206626 | A1 * | 9/2005 | Mattice .................. G06F 3/044 345/173 |
| 2006/0012581 | A1 * | 1/2006 | Haim et al. ................... 345/173 |
| 2006/0022959 | A1 | 2/2006 | Geaghan |
| 2006/0092142 | A1 | 5/2006 | Gillespie et al. |
| 2006/0097991 | A1 | 5/2006 | Hotelling et al. |
| 2006/0232567 | A1 | 10/2006 | Westerman et al. |
| 2007/0074913 | A1 | 4/2007 | Geaghan et al. |
| 2007/0074915 | A1 | 4/2007 | Chung et al. |
| 2007/0084645 | A1 | 4/2007 | Chung et al. |
| 2007/0109274 | A1 * | 5/2007 | Reynolds ...................... 345/173 |
| 2007/0247172 | A1 | 10/2007 | Li |
| 2007/0257890 | A1 * | 11/2007 | Hotelling et al. ............ 345/173 |
| 2007/0268272 | A1 | 11/2007 | Perski et al. |
| 2007/0285365 | A1 | 12/2007 | Lee |
| 2008/0004505 | A1 | 1/2008 | Kapit et al. |
| 2008/0006453 | A1 | 1/2008 | Hotelling |
| 2008/0078590 | A1 | 4/2008 | Sequine |
| 2008/0087477 | A1 | 4/2008 | Cho et al. |
| 2008/0106520 | A1 | 5/2008 | Free et al. |
| 2008/0142281 | A1 | 6/2008 | Geaghan |
| 2008/0158167 | A1 * | 7/2008 | Hotelling et al. ............ 345/173 |
| 2008/0158169 | A1 * | 7/2008 | O'Connor et al. ........... 345/173 |
| 2008/0158175 | A1 | 7/2008 | Hotelling |
| 2008/0162996 | A1 | 7/2008 | Krah et al. |
| 2008/0162997 | A1 | 7/2008 | Vu et al. |
| 2008/0165134 | A1 | 7/2008 | Krah |
| 2008/0251299 | A1 | 10/2008 | Liao et al. |
| 2008/0309625 | A1 | 12/2008 | Krah et al. |
| 2009/0009483 | A1 | 1/2009 | Hotelling et al. |
| 2009/0025987 | A1 * | 1/2009 | Perski et al. ................ 178/18.03 |
| 2009/0066670 | A1 | 3/2009 | Hotelling et al. |
| 2009/0096757 | A1 | 4/2009 | Hotelling et al. |
| 2009/0096758 | A1 | 4/2009 | Hotelling et al. |
| 2009/0194344 | A1 | 8/2009 | Harley et al. |
| 2009/0219258 | A1 | 9/2009 | Geaghan et al. |
| 2009/0244033 | A1 | 10/2009 | Westerman |
| 2009/0284495 | A1 | 11/2009 | Geaghan et al. |
| 2010/0033437 | A1 | 2/2010 | Matsubara |
| 2010/0073323 | A1 | 3/2010 | Geaghan |
| 2010/0149110 | A1 * | 6/2010 | Gray .............................. 345/173 |
| 2010/0188345 | A1 * | 7/2010 | Keskin et al. ................ 345/173 |
| 2010/0300773 | A1 | 12/2010 | Cordeiro et al. |
| 2011/0007021 | A1 * | 1/2011 | Bernstein et al. ............ 345/174 |
| 2011/0157080 | A1 * | 6/2011 | Ciesla et al. ................. 345/174 |

FOREIGN PATENT DOCUMENTS

| | | |
|---|---|---|
| GB | 2072389 | 9/1981 |
| JP | 2288122 | 11/1990 |
| JP | 11305932 | 11/1999 |
| JP | 2000/076014 | 3/2000 |
| JP | 2007/052639 | 3/2007 |
| JP | 2007-334690 | 12/2007 |
| JP | 2009-110418 | 5/2009 |
| JP | 2009/192306 | 8/2009 |
| KR | 10-0453971 | 10/2004 |
| WO | WO 2004/019258 A2 | 3/2004 |
| WO | WO 2004/040606 A2 | 5/2004 |
| WO | WO 2006/104745 A2 | 10/2006 |
| WO | WO 2007/017848 A2 | 2/2007 |
| WO | WO 2008/085720 A1 | 7/2008 |

OTHER PUBLICATIONS

Bao et al.: "DOA Estimation Under Unknown Mutual Coupling and Multipath", IEEE Transactions on Aerospace and Electronic Systems IEEE USA, vol. 41, No. 2, Apr. 2005, pp. 565-573.

Geaghan et al., "Low Cost Mutual Capacitance Measuring Circuits and Methods", Presented at SID Conference, Austin, TX, Jun. 3, 2009, 4 pages.

"Operational_Transconductance_Amplifier", Creative Commons Attribution-ShareALike [Online]. [ updated on the internet Apr. 15, 2010], URL<http://en.wikipedia.org/wiki/Operational_transconductance_amplifier>.

QMatrix Data Sheet, Mutual Capacitance QT60486_104, 2003, Quantum Research Group. Ltd., pp. 1-30.

SID Conference Presentation, "Low Cost Mutual Capacitance Measuring Circuit", 3M Touch Systems, San Antonio, Texas, 9 pages, © 2009.

U.S. Appl. No. 12/618,874, "Touch Sensitive Device Using Threshold Voltage Signal", filed Nov. 16, 2009.

U.S. Appl. No. 12/652,343, "High Speed Noise Tolerant Multi-touch Touch Device and Controller Therefor", filed Jan. 5, 2010.

U.S. Appl. No. 61/348,173, "High Speed Low Power Multi-touch Touch Device and Controller Therefor", filed May 25, 2010.

* cited by examiner

*Fig. 4e* time
(msec or arbitrary)

MULTI-TOUCH TOUCH DEVICE WITH MULTIPLE DRIVE FREQUENCIES AND MAXIMUM LIKELIHOOD ESTIMATION

FIELD OF THE INVENTION

This invention relates generally to touch-sensitive devices, particularly those that rely on a capacitive coupling between a user's finger or other touch implement and the touch device, with particular application to such devices that are capable of detecting multiple touches applied to different portions of the touch device at the same time.

BACKGROUND

Touch-sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

There are several types of technologies for implementing a touch-sensitive device including, for example, resistive, infrared, capacitive, surface acoustic wave, electromagnetic, near field imaging, etc. Capacitive touch-sensing devices have been found to work well in a number of applications. In many touch-sensitive devices, the input is sensed when a conductive object in the sensor is capacitively coupled to a conductive touch implement such as a user's finger. Generally, whenever two electrically conductive members come into proximity with one another without actually touching, a capacitance is formed therebetween. In the case of a capacitive touch-sensitive device, as an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the characteristics of the object as it moves across the touch surface.

There are two known techniques used to capacitively measure touch. The first is to measure capacitance-to-ground, whereby a signal is applied to an electrode. A touch in proximity to the electrode causes signal current to flow from the electrode, through an object such as a finger, to electrical ground.

The second technique used to capacitively measure touch is through mutual capacitance. Mutual capacitance touch screens apply a signal to a driven electrode, which is capacitively coupled to a receiver electrode by an electric field. Signal coupling between the two electrodes is reduced by an object in proximity, which reduces the capacitive coupling.

Within the context of the second technique, various additional techniques have been used to measure the mutual capacitance between electrodes. Each of these techniques has its own capabilities, limitations, and other characteristics, and associated advantages and disadvantages from standpoints such as performance, speed, complexity, cost, and so forth. Moreover, the question of whether a characteristic of a given technique is deemed to be an advantage or disadvantage may depend on the goals of the system designer. For example, the designer of a relatively small touch screen system with low resolution and requiring only one touch detection at a time may consider a characteristic of a given sensing technique to be advantageous, while a designer of a larger touch screen system requiring high resolution and multiple simultaneous touch capability may consider the same characteristic to be a disadvantage.

We have developed additional techniques for the measurement of mutual capacitance in touch screens that system designers may wish to use as they develop new and improved touch panel systems.

BRIEF SUMMARY

The present application discloses, inter alia, touch-sensitive devices capable of detecting multiple touches applied to different portions of the touch device at the same time or at overlapping times.

In some of the disclosed embodiments, a touch-sensitive device includes a touch panel, drive unit, and measurement unit. A touch applied to a given node of the panel changes a capacitive coupling between a given drive and sense electrode of the touch panel. The drive unit delivers first and second drive signals, having different first and second frequencies, to first and second drive electrodes respectively at the same or overlapping times. The measurement unit receives a first response signal from a first sense electrode, and analyzes the signal using maximum likelihood estimation to determine a first coupling capacitance between the first drive electrode and the first sense electrode, and to determine a second coupling capacitance between the second drive electrode and the first sense electrode. Greater numbers of drive electrodes, including in some cases all the drive electrodes, can be driven with unique drive frequencies, and greater numbers of sense electrodes, including in some cases all the sense electrodes, can be sensed by the measurement unit.

The measurement unit may also compare the determined first and second coupling capacitances to first and second coupling capacitance reference values, respectively, in order to determine if touches are occurring at or near nodes corresponding to the intersection of the first drive electrode first and the first sense electrode, and the intersection of the second drive electrode and the first sense electrode, respectively. A difference between the measured coupling capacitance of a particular node and a reference value for that node can be indicative of a touch or a partial touch at the node, depending on the magnitude of the difference.

The device may also include a control unit that is coupled to both the drive unit and the measurement unit. The control unit may utilize control values that are used both to generate the drive signals and to evaluate the response signals. The control values may correspond, for example, to the different drive frequencies of the various drive signals delivered by the drive unit to the various drive electrodes of the touch panel. A first drive frequency $f_1$ may be delivered to a first drive electrode based on a first control value, a second drive frequency $f_2$ may be delivered to a second drive electrode based on a second control value, and so forth. The measurement technique can be simplified and its accuracy can be improved by supplying the control values—which may represent the actual drive frequencies—to the measurement unit and using those control values in the signal analysis, so that the measurement unit need not allocate valuable computational resources to measure or estimate the actual drive frequencies.

The measurement unit may include an analog-to-digital converter to convert the first response signal from an analog format to a digital format. The measurement unit may also determine the first coupling capacitance by calculating an amplitude of a component (at the first drive frequency) of the first response signal using the digitized first response signal and a first control value. The measurement unit may likewise determine the second coupling capacitance by calculating an amplitude of another component (at the second drive frequency) of the first response signal using the digitized first response signal and a second control value, and so on for components of the first response signal at other drive frequencies.

The measurement unit may also evaluate the first response signal over a first sample time, the first sample time corresponding to a first integer number of periods of the first drive frequency and also to a second integer number of periods of the second drive frequency. The use of such a first sample time to evaluate the first response signal, and optionally to also evaluate response signals sensed from other sense electrodes, can be implemented in such a way as to reduce or eliminate the need to rely on bandpass filters to separate signal components at the different drive frequencies. In general, if the drive unit is configured to deliver two or more (e.g., N, where N≥2) unique drive signals to a corresponding number (N) of unique drive electrodes simultaneously or at overlapping times, where each drive signal has a drive frequency that differs from drive frequencies of the other drive signals, then the first sample time can be made to correspond to integer numbers of each of the N different drive frequencies. For example, if the drive unit provides five different drive signals at five different drive frequencies $f_1, f_2, f_3, f_4, f_5$ to five different drive electrodes simultaneously or at overlapping times, then the first sample time can be selected to equal $1/f_{GCF}$, where $f_{GCF}$ is the greatest common factor of the frequencies $f_1, f_2, f_3, f_4, f_5$. Evaluating a given response signal over such time period $1/f_{GCF}$ can help to reduce or eliminate the need to utilize five different bandpass filters to isolate the five different frequency components of the response signal.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1:
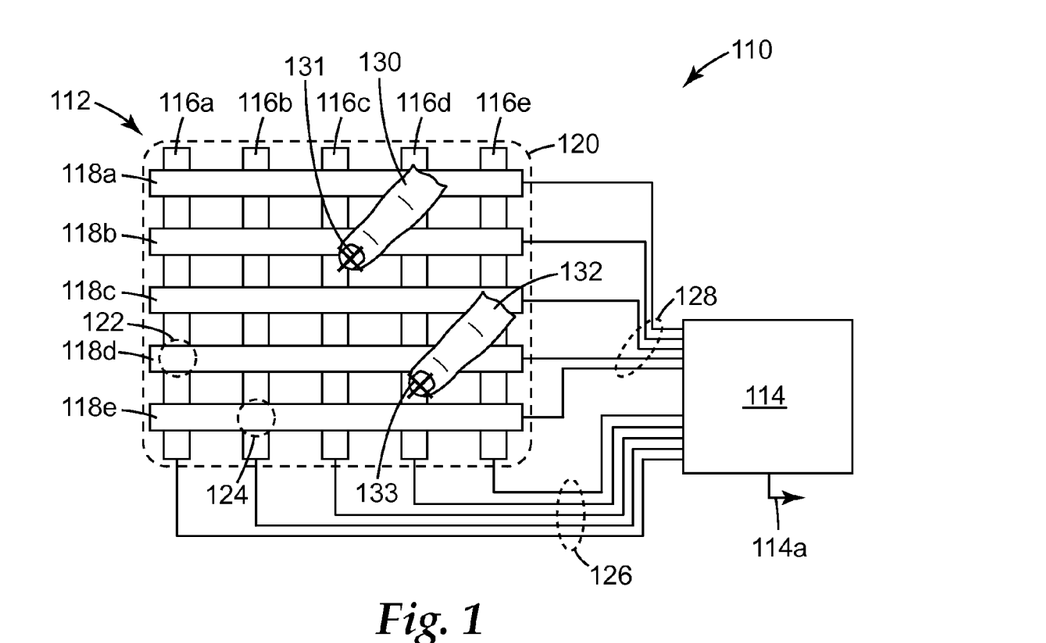
FIG. 1 is a schematic view of a touch device.

In FIG. 1, an exemplary touch device 110 is shown. The device 110 includes a touch panel 112 connected to electronic circuitry, which for simplicity is grouped together into a single schematic box labeled 114 and referred to collectively as a controller.

The touch panel 112 is shown as having a 5×5 matrix of column electrodes 116a-e and row electrodes 118a-e, but other numbers of electrodes and other matrix sizes can also be used. The panel 112 is typically substantially transparent so that the user is able to view an object, such as the pixilated display of a computer, hand-held device, mobile phone, or other peripheral device, through the panel 112. The boundary 120 represents the viewing area of the panel 112 and also preferably the viewing area of such a display, if used. The electrodes 116a-e, 118a-e are spatially distributed, from a plan view perspective, over the viewing area 120. For ease of illustration the electrodes are shown to be wide and obtrusive, but in practice they may be relatively narrow and inconspicuous to the user. Further, they may be designed to have variable widths, e.g., an increased width in the form of a diamond- or other-shaped pad in the vicinity of the nodes of the matrix in order to increase the inter-electrode fringe field and thereby increase the effect of a touch on the electrode-to-electrode capacitive coupling. In exemplary embodiments the electrodes may be composed of indium tin oxide (ITO) or other suitable electrically conductive materials. From a depth perspective, the column electrodes may lie in a different plane than the row electrodes such that no significant ohmic contact is made between column and row electrodes, and so that the only significant electrical coupling between a given column electrode and a given row electrode is capacitive coupling. From the perspective of FIG. 1, the column electrodes 116a-e lie underneath the row electrodes 118a-e. The matrix of electrodes typically lies beneath a cover glass, plastic film, or the like, so that the electrodes are protected from direct physical contact with a user's finger or other touch-related implement. An exposed surface of such a cover glass, film, or the like may be referred to as a touch surface.

The capacitive coupling between a given row and column electrode is primarily a function of the geometry of the electrodes in the region where the electrodes are closest together. Such regions correspond to the "nodes" of the electrode matrix, some of which are labeled in FIG. 1. For example, capacitive coupling between column electrode 116a and row electrode 118d occurs primarily at node 122, and capacitive coupling between column electrode 116b and row electrode 118e occurs primarily at node 124. The 5×5 matrix of FIG. 1 has 25 such nodes, any one of which can be addressed by controller 114 via appropriate selection of one of the control lines 126, which individually couple the respective column electrodes 116a-e to the controller, and appropriate selection of one of the control lines 128, which individually couple the respective row electrodes 118a-e to the controller.

When a finger 130 of a user or other touch implement comes into contact or near-contact with the touch surface of the device 110, as shown at touch location 131, the finger capacitively couples to the electrode matrix. The finger draws charge from the matrix, especially from those electrodes lying closest to the touch location, and in doing so it changes the coupling capacitance between the electrodes corresponding to the nearest node(s). For example, the touch at touch location 131 lies nearest the node corresponding to electrodes 116c/118b. As described further below, this change in coupling capacitance can be detected by controller 114 and interpreted as a touch, or partial touch, at or near the 116a/118b node. Preferably, the controller is configured to rapidly detect the changes in capacitance, if any, of all of the nodes of the matrix, and is capable of analyzing the magnitudes of capacitance changes for neighboring nodes so as to accurately determine a touch location lying between nodes by interpolation. Furthermore, the controller 114 advantageously is designed to detect multiple distinct touches applied to different portions of the touch device at the same time, or at overlapping times. Thus, for example, if another finger 132 touches the touch surface of the device 110 at touch location 133 simultaneously with the touch of finger 130, or if the respective touches at least temporally overlap, the controller is preferably capable of detecting the positions 131, 133 of both such touches and providing such locations on a touch output 114a. The number of distinct simultaneous or temporally overlapping touches capable of being detected by controller 114 is preferably not limited to 2, e.g., it may be 3, 4, or more, depending on the size of the electrode matrix. In at least some of the disclosed embodiments the number of temporally overlapping touches capable of being detected equals the number of nodes in the electrode matrix.

As discussed further below, the controller 114 preferably employs a variety of circuit modules and components that enable it to rapidly determine the coupling capacitance at some or all of the nodes of the electrode matrix. Note that the coupling capacitance can be determined by measuring any suitable parameter or quantity whose value depends on the coupling capacitance. For example, the controller preferably includes a plurality of signal generators that form part of a drive unit. The drive unit delivers drive signals from the signal generators to one set of electrodes, referred to as drive electrodes. In the embodiment of FIG. 1, the column electrodes 116a-e may be used as drive electrodes, or the row electrodes 118a-e may be so used. Preferably, the drive unit delivers multiple drive signals to various ones of the drive electrodes at the same time. For example, the drive unit may deliver a first drive signal to a first drive electrode, while also delivering a second drive signal to a second drive electrode, while also delivering a third drive signal to a third drive electrode, and so forth. The different drive signals preferably oscillate at different drive frequencies. While this is happening, the controller may monitor one, some, or all of the other set of electrodes, referred to as receive electrodes.

The controller 114 may, for example, include one or more sense units coupled to the receive electrodes. A given sense unit receives a response signal from a given receive electrode, the response signal containing signal components at the different drive frequencies. The sense unit may amplify, filter, or otherwise condition the response signal so that the amplitudes of the signal components, which are responsive respectively to the coupling capacitances between the receive electrode and the various drive electrodes that are being driven, can be readily measured by a measurement unit. The measurement unit preferably utilizes a maximum likelihood estimation (MLE) technique to measure the respective amplitudes of the various signal components, which amplitudes are responsive to the coupling capacitance at the nodes defined by the receive electrode and the various drive electrodes that are being driven, and thus also responsive to the touch status of such nodes. The sense unit preferably senses the response signals from all of the sense electrodes in this manner and measures their respective signal components in the same way. After all such measurements have been made, the controller 114 can compare the signal component amplitude measurements to stored reference values for each of the nodes in order to generate a map of which nodes, if any, have experienced a change in coupling capacitance due to the presence of a touch. The stored reference values may be measurements of the coupling capacitances made previously for each of the nodes in the absence of any touches.

As described further below, the controller may also include one or more analog-to-digital converters (ADCs) to convert signals from an analog format to a digital format. Digital-to-analog converters (DACs) may also be used, for example in one or more drive units to convert digital values to an analog drive signal. One or more multiplexers and switches may also be used to avoid unnecessary duplication of circuit elements. Of course, the controller also preferably includes one or more memory devices in which to store the measured amplitudes and associated parameters, and a microprocessor to perform the necessary calculations and control functions. In some cases the controller, and/or other portions of the touch device, can also embody one or more application-specific integrated circuits (ASICs), application-specific standard products (ASSPs), or the like, to carry out one or more of the functions described herein.

By measuring an amplitude of the signal component associated with each of the nodes in the electrode matrix, the controller can generate a matrix of measured values related to the coupling capacitances for each of the nodes of the electrode matrix. The controller can then compare these measured values to a similar matrix of previously obtained reference values in order to determine which nodes, if any, have experienced a change in coupling capacitance due to the presence of a touch.

Figure 2:
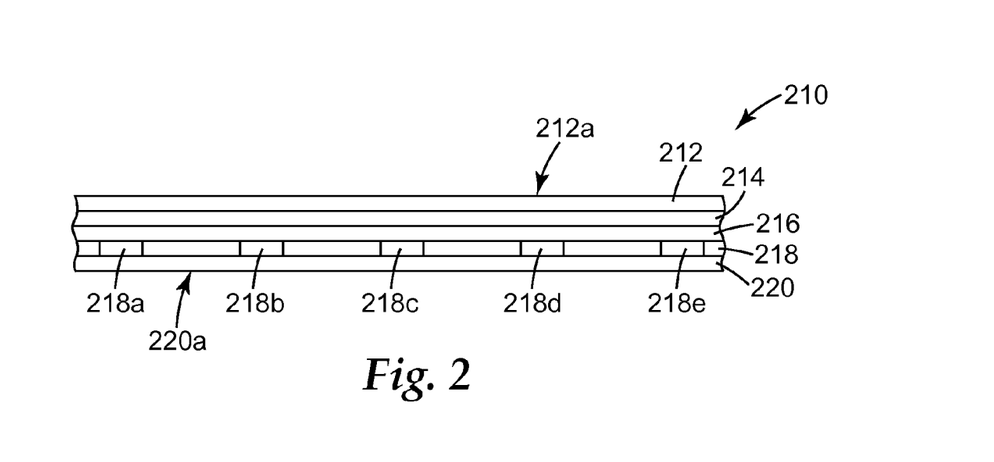
FIG. 2 is a schematic side view of a portion of a touch panel used in a touch device.

Turning now to FIG. 2, we see there a schematic side view of a portion of a touch panel 210 for use in a touch device. The panel 210 includes a front layer 212, first electrode layer 214 comprising a first set of electrodes, insulating layer 216, second electrode layer 218 comprising a second set of electrodes 218a-e preferably orthogonal to the first set of electrodes, and a rear layer 220. The exposed surface 212a of layer 212, or the exposed surface 220a of layer 220, may be or comprise the touch surface of the touch panel 210. The particular touch panel construction shown in FIG. 2 is merely exemplary, and the reader will understand that other touch panel designs can be used without limitation.

Figure 3:
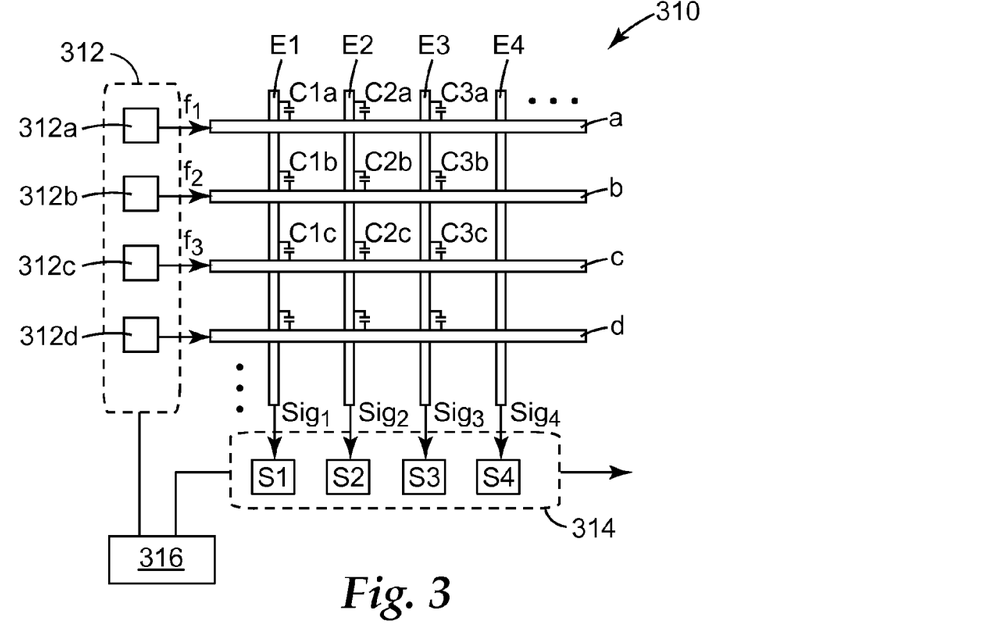
FIG. 3 is a schematic view of a touch device in which relevant drive and detection circuitry is shown in the context of a group of drive electrodes and a group of receive electrodes capacitively coupled thereto.

FIG. 3 depicts a touch device 310 that includes a touch panel having a matrix of capacitively coupled electrodes, and various circuit components and systems that can be used to detect multiple simultaneous touches on the touch panel. The electrode matrix includes a top electrode array comprising at least the four parallel drive electrodes that are shown and labeled as a, b, c, and d. Also included is a lower array comprising at least the four parallel receive electrodes that are shown and labeled as E1, E2, E3, and E4. The top electrode array and the lower electrode array are preferably arranged to be orthogonal to one another, but non-orthogonal designs are also contemplated. The capacitive coupling between each pair of orthogonal electrodes, referred to as the "coupling capacitance" for the given node, is labeled for some of the nodes of the matrix as C1a, C2a, C3a, C1b, C2b, and C3b, etc., through C3c as shown, the values of which may all be approximately equal in an untouched state and which may decrease when a touch is applied as described previously. Alternatively, if desired, the touch panel may be designed such that the coupling capacitances of the various nodes differ significantly from each other.

The reader will understand that the electrode matrix of FIG. 3 may be only a portion of a much larger matrix. In general, the touch panel may have many more (or fewer) drive electrodes, and many more (or fewer) receive electrodes, such that the electrode matrix is an N×M matrix, where N may be less than, equal to, or greater than M. In one specific embodiment of interest capable of use with at least some of the touch measurement techniques described herein, the touch panel may comprise a 40×64 (40 rows, 64 columns) matrix device having a 19 inch diagonal rectangular viewing area with a 16:10 aspect ratio. In this case, the electrodes may have a uniform spacing of about 0.25 inches. Due to the size of this embodiment, the electrodes may have significant stray impedances associated therewith, e.g., a resistance of 40K ohms for the row electrodes and 64K ohms for the column electrodes.

Referring again to FIG. 3, the 16 nodes of this matrix, i.e., the mutual capacitances or coupling capacitances associated therewith, are monitored by: drive unit 312, which may include distinct signal generators 312a-312d; measurement unit 314, which may include distinct sense units S1-S4; and controller 316, all connected as shown with suitable conductive traces or wires, or by other suitable techniques.

In operation, controller 316 causes drive unit 312 to generate drive signals of different frequencies and deliver such drive signals in a distributed fashion to some or all of the drive electrodes. For example, controller 316 may provide a first digital or analog control value to signal generator 312a, causing the signal generator to generate a first drive signal of frequency $f_1$. By means of an electrical connection from the generator 312a to drive electrode a, such drive signal is then delivered to drive electrode a. Similarly, controller 316 may provide second and third digital or analog control values to signal generators 312b, 312c, respectively, and so forth for other signal generators. The second control value causes generator 312b to generate a second drive signal of frequency $f_2$, which is delivered to drive electrode b, while the third control value causes generator 312c to generate a third drive signal of frequency $f_3$, which is delivered to drive electrode c. The drive signals are preferably periodic, e.g., sinusoidal, although non-sinusoidal waveforms may also be used if desired. The drive signals are also preferably delivered to the different drive electrodes at the same time. That is, whether the drive signals are initiated at precisely the same time or at different times, the drive signals are delivered to their respective drive electrodes over time intervals that entirely, or almost entirely, overlap with each other. The frequencies $f_1$, $f_2$, $f_3$, etc. are preferably different from each other by amounts that are sufficient to permit the measurement unit to readily isolate an individual frequency component (e.g., $f_1$) from other frequency components (e.g., $f_2$, $f_3$, etc.) of the detected response signal. If desired, the frequencies may be conveniently selected to be equally spaced in frequency, such as where $f_1=f_1$, and $f_2=f_1+\Delta f$, and $f_3=f_1+2\Delta f$, and so forth. Alternatively, nonuniform frequency spacing can be used.

Each drive signal couples to a plurality of, and preferably to every one of, the receive electrodes E1-E4 via their respective mutual capacitances with the given drive electrode. Thus, the first drive signal of frequency $f_1$ couples from drive electrode a to receive electrode E1 via coupling capacitance C1a, and also couples to receive electrode E2 via coupling capacitance C2a, and also couples to receive electrode E3 via coupling capacitance C3a, and so forth. While this is occurring, the second drive signal of frequency $f_2$ couples from drive electrode b to the same receive electrodes E1, E2, E3, etc. via the nodes whose coupling capacitances are C1b, C2b, C3b, etc. Other drive signals similarly couple from their respective drive electrode to the receive electrodes. In this way, response signals are produced on the receive electrodes that collectively contain information about the coupling capacitances at all of the nodes being driven. The receive electrode E1, for example, provides a first response signal, labeled $Sig_1$, that comprises a superposition of the following signal components: the first drive signal (at frequency $f_1$) coupled at node E1/a via coupling capacitance C1a; the second drive signal (at frequency $f_2$) coupled at node E1/b via coupling capacitance C1b; the third drive signal (at frequency $f_3$) coupled at node E1/c via coupling capacitance C1c; and so forth if other drive signals are provided on other drive electrodes. The other receive electrodes E2, E3, E4 provide second, third, and fourth response signals $Sig_2$, $Sig_3$, $Sig_4$ in a similar fashion.

It is often advantageous to amplify, filter, and/or otherwise condition the raw response signals from the receive electrodes before attempting to measure the features of interest from the various signals, i.e., the features that are indicative of the various coupling capacitances which in turn are indicative of touch(es). In measurement unit 314, signal conditioning is accomplished by sense units S1-S4, one of which is connected to each receive electrode as shown. In alternative embodiments, the device 310 may contain fewer sense units than receive electrodes, and multiplexers can be employed to couple a given sense unit to two or more different receive electrodes. With regard to the sense units themselves, in an exemplary embodiment discussed further below the sense units may help to avoid cross-coupling between electrodes by holding each receive electrode at a known voltage level, also referred to as a virtual ground even though the voltage level may be very different from zero (ground) potential. In some cases it may be desirable to digitize the response signal, i.e., convert it from an analog format to a digital format using any suitable analog-to-digital converter (ADC). Multiple such ADCs may be provided for all the sensing channels, e.g., with each sense unit containing one or more dedicated ADC. Alternatively, one or more ADC may be shared between two or more sensing channels by multiplexing.

After signal conditioning, the question remains of how to extract the coupling capacitance information for each of the nodes from the response signals, which now may be signal conditioned.

In one possible approach, each response signal can be digitized and evaluated using a known fast fourier transform (FFT) technique implemented on a microcontroller or other suitable device. The FFT provides a frequency-domain output vector, the elements of which represent the amplitudes of given frequency components of the time-domain response signal over a range of frequencies. The equation for this type of transformation is as follows:

$$X[k] = \sum_{n=0}^{N-1} x[n] W_N^{kn}, \quad \text{(Eq. 1)}$$

where:
 k=frequency number;
 n=sample number (time domain);
 N=total number of samples;
 x[n]=signal amplitude at time n; and $$W_N^{kn} = e^{-j(2\pi/N)kn}.$$

To determine the amplitude at a particular frequency, the following equation is used:

$$A_K = \left(\frac{2}{N}\right)|X[k]|. \quad \text{(Eq. 2)}$$

Assuming X[k] is complex, to compute all N values of the discrete fourier transform (DFT), $N^2$ complex multiplications and N*(N−1) complex additions are required. Due to the nature of this transformation, selecting the number of samples (N) to be a factor of 2 allows the implementation to be optimized for time. This allows the DFT to be decomposed into smaller DFTs, which in turn reduces the total number of complex multiplications and additions to $N*\log_2(N)$.

In this approach, one may analyze the FFT output vector by identifying local peak amplitudes that exceed a given threshold value, where the frequencies at which such local peak amplitudes occur would be expected to correlate with the drive frequencies of the drive signals. Correlating the peak amplitudes with the drive frequencies therefore allows one to associate a given peak amplitude, measured from a given receive electrode, with a given node of the electrode matrix.

In another possible approach, the response signal may be delivered to a bank of narrow bandpass analog filters, each filter configured to substantially transmit frequencies in a narrow band that encompasses only one of the drive frequencies, with substantial attenuation at the other drive frequencies. For example, the response signal may be split into multiple channels, with one channel having a bandpass filter centered at frequency $f_1$, and another channel having a bandpass filter centered at frequency $f_2$, and another channel having a bandpass filter centered at frequency $f_3$, and so on. With sufficiently high cutoff characteristics and sufficiently low system noise, one may choose to measure the amplitude of the output signal from each of the bandpass filters with a simple peak detection circuit or the like, for example. Alternatively, this approach may be combined with a maximum likelihood estimation (MLE) approach, described below.

The reader will also appreciate that digital bandpass filters can be used in place of analog bandpass filters, and that combinations of digital and analog bandpass filters can also be used as desired.

We have found MLE techniques to be particularly advantageous for use with the touch devices disclosed herein that employ multiple drive frequencies. A maximum likelihood estimator is based on the notion that an unknown parameter, θ, can be estimated by determining the value of this parameter that maximizes the probability density function p(x;θ). If we maximize p(x;A), where A is the amplitude, we arrive at the following equation for the amplitude at a particular frequency of interest $f_{int}$:

$$A = \left(\frac{2}{N}\right)\left|\sum_{n=0}^{N-1} x[n] e^{-j(2\pi f_0 n)}\right|, \quad \text{(Eq. 3)}$$

where:
 n=sample number (time domain);
 N=total number of samples;
 x[n]=signal amplitude at time n;
 $f_0=f_{int}/f_s$ (normalized frequency); and
 $f_s$=sampling frequency.

Thus, rather than analyzing the time-domain signal for all frequencies as with FFT, only the frequency of interest $f_{int}$ need be evaluated when using MLE. This greatly reduces the number of calculations needed. Of course, the frequencies of interest for purposes of the disclosed touch devices are the drive frequencies being used: $f_1$, $f_2$, and so forth. By knowing these frequencies very precisely, we can obtain accurate and reliable values for each amplitude A associated with each frequency f, for each response signal. One way of ensuring this is for the controller 316 to provide control values to the signal generators, which the signal generators then use to generate drive signals of the specific frequencies $f_1$, $f_2$, and so forth. The same control values that are used to generate these frequencies can then also be provided by the controller 316 to the measurement unit 314, which implements the MLE methodology described herein on each response signal from each receive electrode. In calculating the amplitude A of a given signal component at a given drive frequency f, the measurement unit can use the control value for such frequency, or a number based thereon, as its value of the frequency of interest $f_{int}$.

Some observations can be made with respect to Equation (3) above. First, the equation does not require any knowledge of signal phase. This differentiates MLE from certain other techniques that may be used to measure the amplitudes of the signal components. Synchronous demodulation techniques, for example, require mixers that are in-phase or leading or lagging the stimulation frequency by precisely 90 degrees. A second observation is that Equation (3) is a "complex" equation, with both a real and imaginary part. For better suitability in embedded touch-sensitive devices, Equation (3) can be rewritten as:

$$A = \left(\frac{2}{N}\right)\sqrt{\left(\sum_{n=0}^{N-1} x[n]*\cos(2\pi f_0 n)\right)^2 + \left(\sum_{n=0}^{N-1} x[n]*\sin(2\pi f_0 n)\right)^2}. \quad \text{(Eq. 4)}$$

For further convenience and speed, we can avoid the square root calculation by configuring the system to operate in terms of the square of the amplitude ($A^2$), or a parameter proportional to $A^2$, rather than the amplitude itself, using the quantity on the right-hand-side of the relationship:

$$A^2 \propto \left(\sum_{n=0}^{N-1} x[n] * \cos(2\pi f_0 n)\right)^2 + \left(\sum_{n=0}^{N-1} x[n] * \sin(2\pi f_0 n)\right)^2. \quad \text{(Eq. 5)}$$

In view of the system's ability to operate on the basis of the actual amplitude A or other amplitude-related quantities, such as the amplitude squared ($A^2$), or a quantity proportional to $A^2$ (such as the right-hand-side of the relationship of Equation (5)), or a quantity proportion to the amplitude A, we use the term "amplitude-related quantity" to encompass all of these possibilities, including the actual amplitude A. We use the term "amplitude-squared-related quantity" to encompass the amplitude squared $A^2$ and any quantities proportional thereto.

If no attempt is made to filter the response signal, then the function x[n], which represents the raw amplitude of the response signal as sampled in the time domain, will contain not only the signal component at the frequency of interest $f_{int}$, but also the signal components at the other drive frequencies. These other signal components will in general behave as noise in Equations (3)-(5), which can introduce unwanted error and variation in the measurement of the amplitude-related quantity. One approach to avoid these issues is to employ one or more bandpass filters as described above to isolate each drive frequency component of the response signal from the other drive frequencies. Thus, a first bandpass filter can filter the conditioned response signal so that signal components at and near the drive frequency $f_1$ are passed, but signal components at the other drive frequencies $f_2$, $f_3$, etc. are substantially attenuated. The amplitude-related quantity of the signal component at the drive frequency $f_1$ is then calculated using the above MLE techniques wherein this filtered signal, as sampled in the time domain, is used for the function x[n]. A second bandpass filter can filter the conditioned response signal to pass components at and near the drive frequency $f_2$, while attenuating components at the other drive frequencies $f_1$, $f_3$, and so forth, and this filtered signal, as sampled in the time domain, is used for the function x[n] in the MLE calculation of the amplitude-related quantity of the signal component at drive frequency $f_2$. The amplitude-related quantity of the other signal components at the other drive frequencies $f_3$ and so forth can be obtained in similar fashion.

In practical systems, the drive frequencies may be relatively closely spaced, e.g., in some cases exhibiting a frequency spacing $\Delta f$ roughly on the order of 10 kHz, such that the bandpass filters, if used, may need to have high-order cutoff characteristics to adequately isolate a given drive frequency. Such high-order characteristics may in some cases result in undesirably slow response times due to, for example, long computational times in embedded systems.

We have found that bandpass filtering of the response signals can be advantageously avoided by judicious selection of the sample time that is used in the calculation of the amplitude-related quantities. This involves appropriate selection of the sampling frequency, $f_s$, and the total number of samples, N. Of course, the sampling frequency is typically chosen to be at least as great as the Nyquist rate, which is the minimum sampling rate required to avoid aliasing, and equal to twice the highest frequency contained within the signal. And for purposes of the touch-sensitive devices described herein, the highest significant frequency in a given response signal is typically the highest of the drive frequencies used, i.e., max[$f_1$, $f_2$, $f_3$, etc.]. In any event, we have found that bandpass filtering of the response signals can be avoided by selecting a sample time that corresponds to an integer number of periods of the drive frequency signals. This condition causes the sum of the signal x[n] in Equations (3)-(5) above to equal substantially zero for all drive frequencies other than the drive frequency of interest, $f_{int}$. Another way of expressing the desired condition is to select a total sample time that is the reciprocal of $f_{GCF}$ (or an integer number times this reciprocal, if speed is not a concern), where $f_{GCF}$ is defined as the greatest common factor of the drive frequencies $f_1$, $f_2$, $f_3$, etc. used for the drive signals.

In one exemplary embodiment, suppose that the following four drive frequencies are used: $f_1$=40 kHz, $f_2$=55 kHz, $f_3$=70 kHz, $f_4$=85 kHz. Suppose further that we select a sampling frequency $f_s$ of 500 kHz. The greatest common factor frequency $f_{GCF}$=5 kHz, and its reciprocal provides a total sample time of 200 microseconds. This sample time corresponds to a total number of samples (N) of 100 (=200 microseconds*500 kHz). The 200 microsecond sample time also corresponds to 8 periods of the 40 kHz frequency, 11 periods of the 55 kHz frequency, 14 periods of the 70 kHz frequency, and 17 periods of the 85 kHz frequency, i.e., integer numbers of periods for each of the drive signals. With the 200 microsecond sample time (or N=100) selected, a response signal from a given one of the receive electrodes E1, E2, etc. can be evaluated by solving Equation (5) using the appropriate information and algorithm. If the algorithm is implemented in, for example, a 150 MHz clock digital signal processor (DSP) with DMAC capabilities, utilizing sine and cosine look-up tables, and avoiding the square-root function, the time required to calculate the amplitude-related quantity for the five frequencies, using 200 samples (=400 microseconds*500 kHz) for each response signal, and performing these calculations for a total of 16 response signals corresponding to 16 receive electrodes, is 200 microseconds, which is shorter than the 400 microsecond time it takes to sample each response signal at 500 kHz.

Figure 4A:
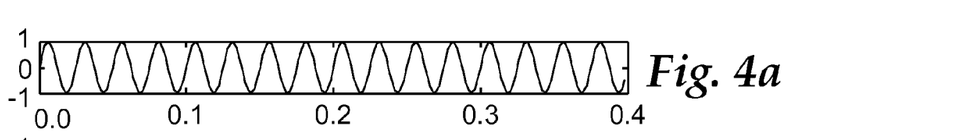
FIGS. 4a-e are graphs showing the amplitude vs. time of a plurality of possible drive signals.
Figures 4B, 4C:
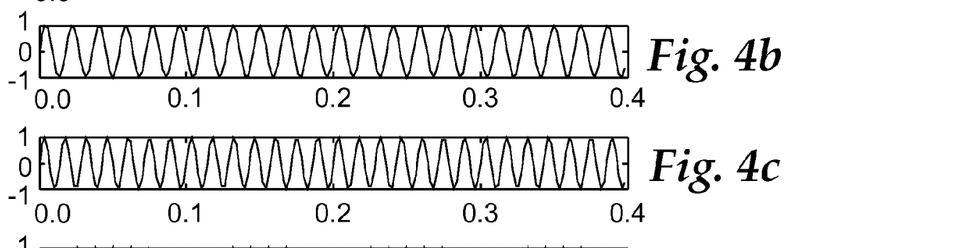
Figures 4D, 4E:
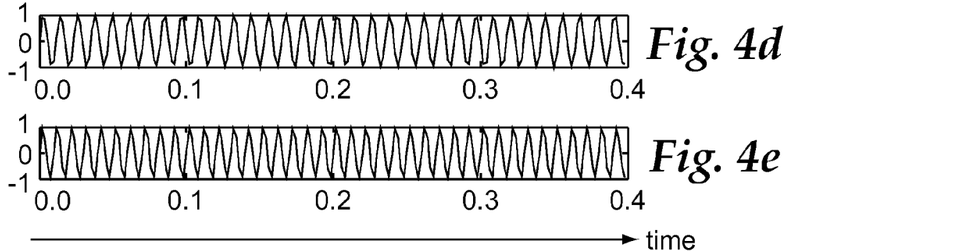
Figure 5:
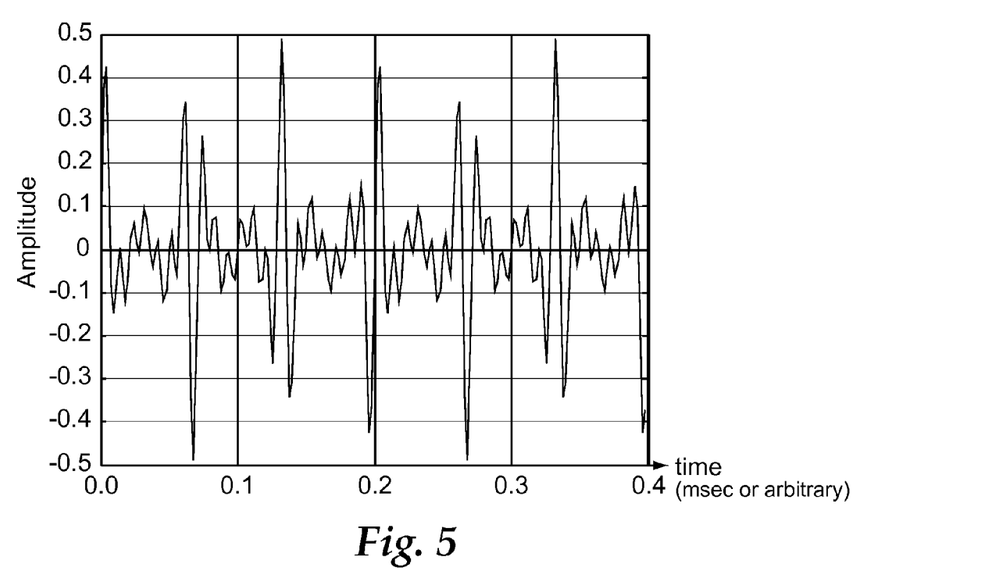
FIG. 5 is a graph showing the amplitude vs. time of a representative response signal that may be obtained from the drive signals of FIG. 8.

FIGS. 4a-e depict graphs showing the amplitude vs. time of a plurality of possible drive signals in a different exemplary embodiment. In this embodiment, five drive signals are used, with $f_1$=40 kHz (FIG. 4a), $f_2$=55 kHz (FIG. 4b), $f_3$=70 kHz (FIG. 4c), $f_4$=85 kHz (FIG. 4d), $f_5$=100 kHz (FIG. 4e). The time window shown in the figures, which is actually used in the measurement stage but is superimposed on the drive signals for illustrative purposes, has a length of 0.4 millisecond which corresponds to integer numbers of 16, 22, 28, 34, and 40 periods of the first through the fifth drive frequencies, respectively. When delivered at overlapping times to different selected drive electrodes, the drive signals couple to each of the receive electrodes via capacitive coupling at the respective nodes of the electrode matrix. FIG. 5 is a graph showing the amplitude vs. time of a representative response signal that may be obtained from one such receive electrode, when the drive signals of FIGS. 4a-e are used. In order to extract from this signal the values of the coupling capacitance between the receive electrode and each of the five drive electrodes, the signal may be digitized at a suitable sampling rate $f_s$, and an amplitude-related quantity for each of the five frequency components of the response signal can be obtained by performing the calculation set forth in Equation (5), or as otherwise described herein. The result is a calculated amplitude, or other amplitude-related quantity, for each of the nodes between the receive electrode and the five drive electrodes.

Figure 6:
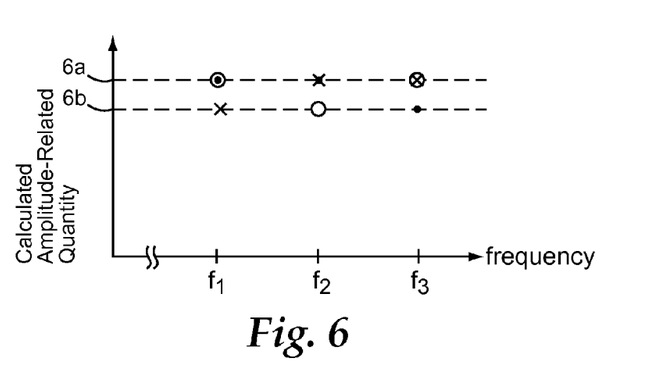
FIG. 6 is a graph showing representative calculated amplitudes of different frequency components of different response signals, for a hypothetical situation of three touches occurring at three different nodes of a touch panel.

FIG. 6 is a graph showing representative calculated amplitudes, or other amplitude-related quantities, of different frequency components of different response signals, for a hypothetical situation of three touches occurring at three different nodes of a touch panel. In the figure, the "x", "o", and (dot) symbols depict the amplitude-related quantities calculated for response signals obtained from a first, second, and third receive electrode, respectively, all while at least a first, second, and third drive electrode were being driven by drive signals at frequencies $f_1$, $f_2$, $f_3$ respectively. The amplitude-related quantities are shown for simplicity to fall either at a high value 6a or a low value 6b, but in real systems and for real touches the calculated quantities can take on intermediate values also. Since the presence of a touch at a node normally decreases the coupling capacitance at the node, high calculated values normally indicate the absence of a touch, and low calculated values indicate the presence of a touch. In the example of FIG. 6, the first receive electrode ("x" symbols) provides a low calculated value at frequency $f_1$, the second receive electrode ("o" symbols) provides a low calculated value at frequency $f_2$, and the third receive electrode (dot symbols) provides a low calculated value at frequency $f_3$. Thus, the calculated quantities of FIG. 6 are indicative of three touches occurring on the touch panel at overlapping times: one at the node of the first sense electrode and the first drive electrode; one at the node of the second sense electrode and the second drive electrode; and one at the node of the third sense electrode and the third drive electrode.

Figure 7:
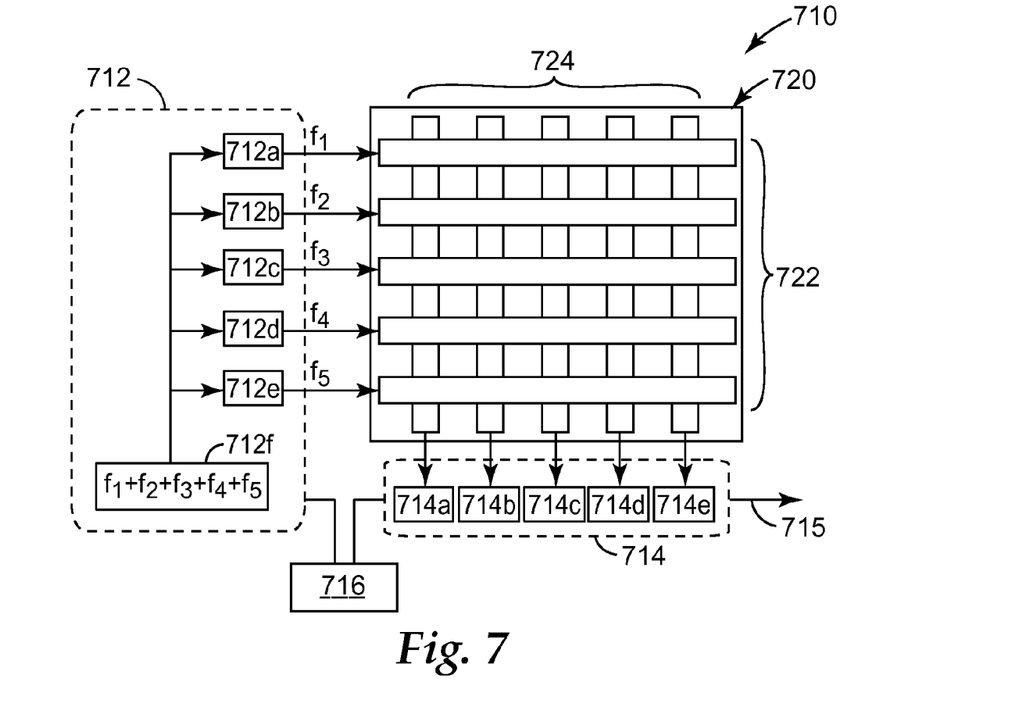
FIG. 7 is a schematic view of a touch device similar to that of FIG. 3, but showing additional detail in relation to the operation of the drive unit.

FIG. 7 depicts a touch device 710 that includes a touch panel 720 having a matrix of capacitively coupled electrodes, and circuit components and systems that can be used to detect multiple simultaneous touches on the touch panel. The electrode matrix includes an upper electrode array of five drive electrodes, collectively labeled 722. Also included is a lower electrode array of five receive electrodes that are collectively labeled 724. Capacitive coupling occurs between each drive electrode and each receive electrode at the node of their apparent intersection, such coupling capacitance changing in response to the presence of a user's finger or other touch implement at the node. The reader will understand that five drive and receive electrodes are shown for illustrative purposes, but that other numbers of electrodes can be used as desired to provide an N×M matrix generally.

The coupling capacitances at the 25 nodes of panel 720 are monitored by drive unit 712, measurement unit 714, and controller 716. In this embodiment, the drive unit utilizes a single signal generator 712f in combination with a plurality of bandpass filters 712a-e as shown to provide the individual drive signals. More specifically, signal generator 712f generates a compound signal that contains a plurality of distinct periodic signal components. The compound signal may be of the form $\Sigma(p_{\tau,i}(t))$, where the summation is over the incremental variable i, and $p_{\tau,i}(t)$ represents a periodic signal having a period τ that is unique to the particular value of i. In one example, each $p_{\tau,i}(t)$ may be of the form $\sin(2\pi t f_i)$, but non-sinusoidal periodic signals may also be used as desired. The compound signal is coupled to all of the bandpass filters 712a-e, each of which has a predetermined center frequency so as to pass one of the selected drive frequencies $f_1$, $f_2$, $f_3$, $f_4$, $f_5$ and attenuate the others. The bandpass filters, and/or other circuitry such as the sense units and signal generators, may be implemented on a PCB board, on a flex tail, or on a circuit disposed directly on the border or edge of the touch panel, depending on the desired integration. In essence, one may consider the combination of generator 712f and filter 712a as forming a first effective signal generator for frequency $f_1$, and the combination of generator 712f and filter 712b as forming a second effective generator for frequency $f_2$, and so forth.

Just as with the other embodiments described previously, the drive signals delivered to the various drive electrodes 722 are coupled to the receive electrodes 724 via the coupling capacitances at the applicable nodes of the matrix. The resulting response signals obtained from the receive electrodes 724 may be signal conditioned by sense units 714a-e, and further processed by the measurement unit 714, preferably using the MLE techniques described above, to obtain measurements of the coupling capacitance at each of the nodes of the matrix, whether by use of an amplitude-related quantity or an amplitude-squared-related quantity as representing each coupling capacitance. Comparison of the calculated values with reference values yields a map or matrix of touch information over the entire touch pad, the output of which is represented by output 715.

Figure 8:
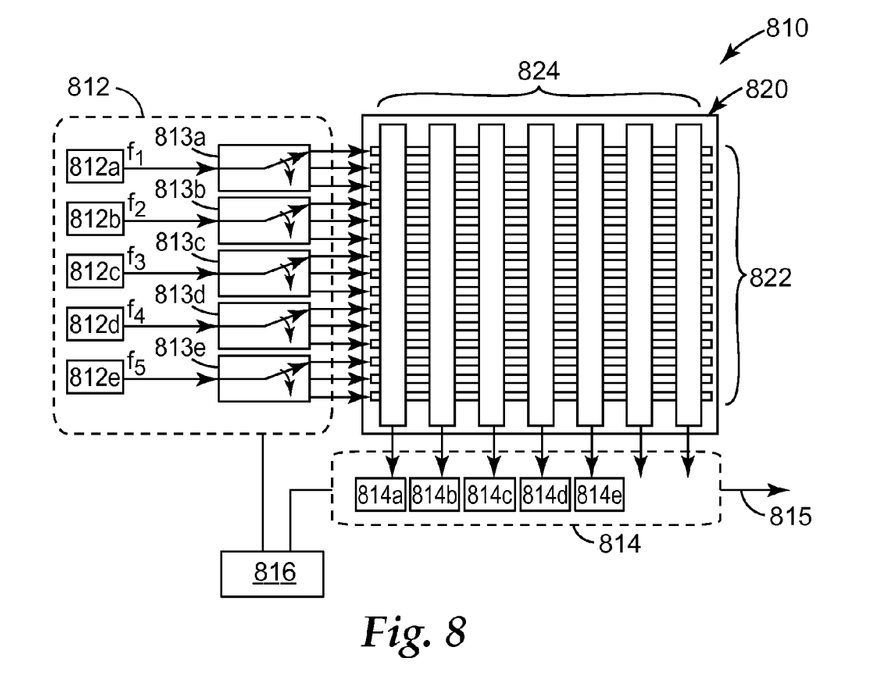
FIG. 8 is a schematic view of a touch device similar to that of FIG. 7, but showing detail in relation to an alternative or additional operation of the drive unit.

In FIG. 8, a touch device 810 includes a touch panel 820 having a matrix of capacitively coupled electrodes, and circuit components and systems that can be used to detect multiple simultaneous touches on the touch panel. The electrode matrix includes a lower electrode array of fifteen drive electrodes, collectively labeled 822. Also included is an upper electrode array of five receive electrodes that are collectively labeled 824. Capacitive coupling occurs between each drive electrode and each receive electrode at the applicable node, as discussed above. Although fifteen drive electrodes and five receive electrodes are shown, other numbers of electrodes can be used as desired to provide an N×M matrix generally.

The coupling capacitances at the 75 nodes of panel 820 are monitored by drive unit 812, measurement unit 814, and controller 816. In this embodiment, the drive unit utilizes combinations of signal generators and multiplexers so that more drive electrodes can be driven using fewer drive frequencies. Signal generators 812a-e, which generate periodic signals at unique frequencies $f_1$-$f_5$ respectively, are combined with a bank of 1×3 multiplexers 813a-e as shown. Controller 816 controls each multiplexer to cyclically couple the multiplexer input (i.e., the output of the associated signal generator) to each of the three multiplexer outputs in a repeating sequence. The multiplexer outputs are connected to three different drive electrodes, which may be neighboring drive electrodes as shown in the FIG. 8, or may be interspersed with other drive electrodes. In the former case, the first drive signal (frequency $f_1$) may be delivered to the first drive electrode, while the second drive signal ($f_2$) is delivered to the fourth drive electrode, the third drive signal ($f_3$) is delivered to the seventh drive electrode, and so on. After the measurement unit takes coupling capacitance measurements from the response signals of all the receive electrodes, the controller 816 cycles the multiplexers so that the first drive signal is delivered to the second drive electrode, the second drive signal is delivered to the fifth drive electrode, and the third drive signal is delivered to the eighth drive electrode, and so on. By the time the multiplexers have been cycled through the last of their output states, the measurement unit has measured the coupling capacitances for all nodes of the electrode matrix, and converted such measurements into a map or matrix of touch information over the entire touch pad, the output of which is represented by output 815.

In an alternative embodiment, the outputs of a given multiplexer can be delivered to electrodes that are interspersed with other electrodes. For example, the outputs of the first multiplexer can be connected to the first, sixth, and eleventh drive electrodes, the outputs of the second multiplexer can be connected to the second, seventh, and twelfth drive electrodes, and so on. In this case, in a first step, the controller 816 causes the first drive signal to be delivered to the first drive electrode, while the second drive signal is delivered to the second drive electrode, the third drive signal is delivered to the third drive electrode, and so on. After the measurement unit takes coupling capacitance measurements from the response signals of all the receive electrodes, the controller 816 cycles the multiplexers so that the first drive signal is delivered to the sixth drive electrode, the second drive signal is delivered to the seventh drive electrode, the third drive signal is delivered to the eighth drive electrode, and so on. By the time the multiplexers have been cycled through the last of their output states, the measurement unit has measured the coupling capacitances for all nodes of the electrode matrix, and converted such measurements into a map or matrix of touch information over the entire touch pad, the output of which is represented by output 815.

In another alternative embodiment, instead of synchronously controlling all of the various multiplexers such that they all shift states at substantially the same time and such that they always have the same state (e.g., the multiplexers all couple their respective multiplexer inputs to the same multiplexer output lead in unison), control of the multiplexers can be randomized. Thus, for example, at a time when the first multiplexer provides its output on a first output lead, the second multiplexer may provide its output on a third output lead, while the third multiplexer may provide its output on a second output lead. Sequencing of the states of the different multiplexers can be randomized for rapid touch detection either statically or dynamically.

In still another alternative embodiment, which may be combined with any of the above multiplexer connection schemes, the device 810 may be adapted to operate in two distinct operating modes. In a first operating mode, each drive signal is coupled to all of the multiplexer outputs at the same time. Thus, for example, the first drive signal may be delivered to the first through third electrodes at the same time, or to the first, sixth, and eleventh electrodes at the same time, depending on how the multiplexers are connected to the drive electrodes. In either case, response signals from the receive electrodes would collectively contain information from all nodes of the electrode matrix without any cycling of the multiplexers. Such mode may be used as a low resolution "standby" mode. If any change is detected for any amplitude-related quantity for any of the drive frequencies, which change is indicative of a touch somewhere on the panel, such change may trigger the device 810 to shift to a second mode of operation in which each multiplexer connects its input to only one of its outputs in sequence, as described above. This second operating mode may be used as a high resolution "active" mode.

Just as with the other embodiments described previously, the drive signals delivered to the various drive electrodes 822 are coupled to the receive electrodes 824 via the coupling capacitances at the applicable nodes of the matrix. The resulting response signals obtained from the receive electrodes 824 may be signal conditioned by sense units 814a-e, and further processed by the measurement unit 814, preferably using the MLE techniques described above, to obtain measurements of the coupling capacitance at each of the nodes of the matrix, whether by use of an amplitude-related quantity or an amplitude-squared-related quantity as representing each coupling capacitance. Comparison of the calculated values with reference values yields a map or matrix of touch information over the entire touch pad, the output of which is represented by output 815.

In other embodiments, whether or not multiplexers are used in the drive unit 812, multiplexers can be used in the measurement unit 814 in completely analogous ways to those described above for the drive unit. For example, subsets of receive electrodes can be coupled sequentially, via a multiplexer, to sense units and/or measurement units (the measurement units performing the MLE calculations or other calculations) that are shared between the electrode subsets. In some cases, only one sense/measurement unit may be used for all of the receive electrodes, but the time needed to couple such unit to each of the receive electrodes for a sufficient time to perform the coupling capacitance calculations for each drive frequency may be prohibitively slow.

Figure 9:
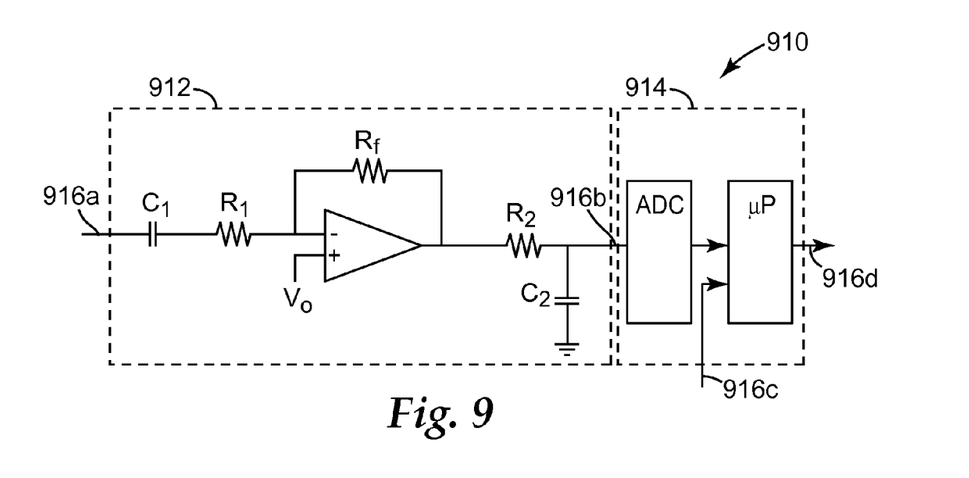
FIG. 9 is a schematic view of detection and analysis circuitry that can be used in at least some of the disclosed embodiments.

Turning now to FIG. 9, we see there exemplary detection and analysis circuitry 910 that can be used in at least some of the disclosed embodiments. The circuitry 910 comprises a sense unit 912 and a measurement unit 914. The sense unit has an input lead 916a which electrically connects, whether directly or through a multiplexer or switch, to one or more of the receive electrodes as taught above. The capacitors $C_1$, $C_2$, resistors $R_1$, $R_2$, $R_f$, and operational amplifier $OA_1$ are connected as shown to amplify and convert the current-based signal received from the receive electrode to a voltage-based signal on an output lead 916b of the sense unit 912. This lead also corresponds to the input lead of the measurement unit 914. The non-inverting input of the operational amplifier is connected to a known voltage level $V_0$, also referred to as a virtual ground, which helps to prevent cross-coupling between the receive electrodes. In one illustrative embodiment, $C_1=1$ microfarad, $C_2=27$ picofarads, $R_1=1$ kohm, $R_2=100$ ohms, $R_f=2$ kohms, and $V_0=1.5$ volts.

The sense unit 912 amplifies, filters, and/or otherwise conditions the raw response signals from the receive electrodes. The conditioned response signal is provided on lead 916b to the measurement unit 914. In FIG. 9, an analog-to-digital converter (ADC) is shown as being included in the measurement unit, but it could alternatively be grouped in the sense unit 912. The ADC digitizes the signal in preparation for calculations to be made by a microprocessor (µP), which measures features of interest from the various signals, i.e., the features discussed above, such as the amplitude-squared-related quantities and other amplitude-related quantities, that are indicative of the various coupling capacitances which in turn are indicative of touch(es). The microprocessor may also receive frequency information from an input 916c, which information may comprise one or more control values from a control unit, or other data indicative of the actual drive frequencies $f_1$, $f_2$, etc. used in the drive signals. The microprocessor processes the digitized response signal, optionally with the frequency information and preferably using the MLE techniques described above, to obtain measurements of the coupling capacitance at each of the nodes of the receive electrode, whether by use of an amplitude-squared-related quantity or other amplitude-related quantity as representing each of the coupling capacitances. Comparison of the calculated values with reference values yields a set of touch information for the receive electrode, the output of which is provided on the output 916d. This touch information, when combined with similar touch information from the other receive electrodes of the electrode matrix, allow the touch system to provide a map or matrix of touch information for all the nodes of the touch pad.

Figure 10:
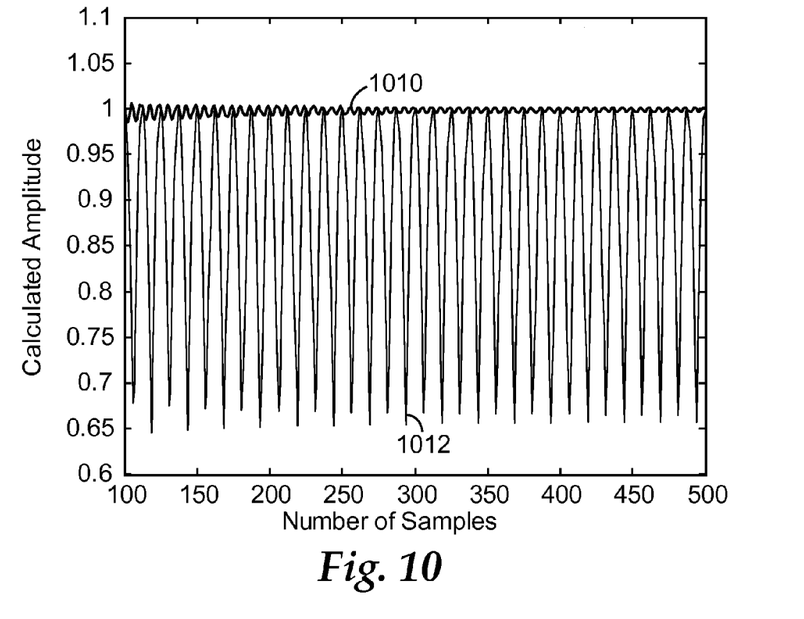
FIG. 10 is a graph showing the calculated amplitude of a frequency component of a representative response signal as a function of the number of sample points used, where the amplitude calculated using maximum likelihood estimation (MLE) can be compared to the amplitude calculated using a fast fourier transform (FFT)
Figure 11A:
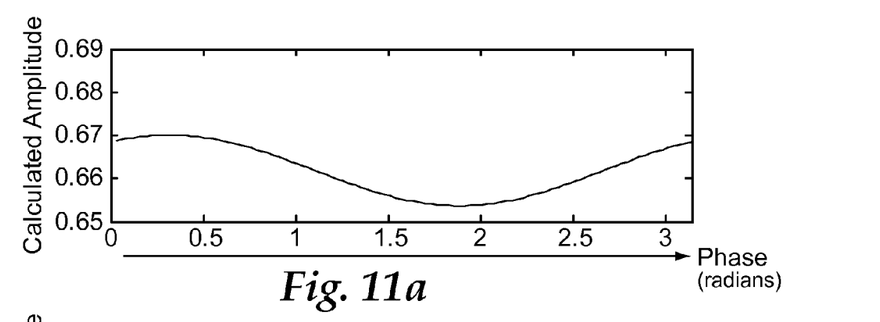
FIGS. 11a-b are graphs showing the calculated amplitude of a frequency component of a representative response signal as a function of the phase of the response signal, where graph 11a shows the amplitude calculated using FFT and graph 11b shows the amplitude calculated using MLE.
Figure 11B:
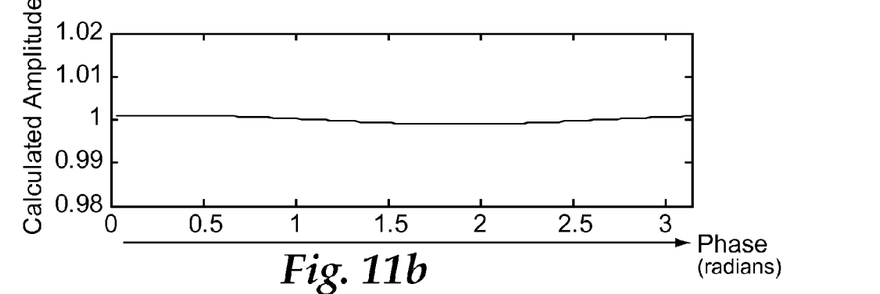

Turning now to FIGS. 10 and 11, these figures compare the performance of the MLE technique discussed above with the FFT technique discussed above, for certain representative signals and operating conditions. The comparisons help to illustrate some of the advantages of the MLE technique relative to FFT.

In connection with FIG. 10, we defined a signal of unit amplitude and 40 kHz frequency. We then digitized this signal by sampling it at a 500 kHz sample rate. From this digitized signal we produced a sequence of finite digitized signals, which differed from each other only by the number of samples N included in the signal. We investigated the case where the number of samples N ranged from 100 (corresponding to a shortest finite digitized signal having a total sample time of 200 microseconds) to 500 (corresponding to a longest finite digitized signal having a total sample time of 1 millisecond). Again, each of these finite digitized signals was calculated assuming a single fixed frequency of 40 kHz and amplitude of 1.0. Each of these finite digitized signals was evaluated using the MLE methodology (see e.g. Equation (4) above) and the FFT methodology (see e.g. Equation (2) above) to compute the amplitude of the signal. For the MLE methodology, the normalized frequency $f_0$ was set to 0.08 (=40 kHz/500 kHz), and the amplitude calculated accordingly. For the FFT methodology, the frequency number k that yielded a maximum value for the calculated amplitude was assumed to be the signal frequency, and the amplitude value calculated for that frequency number k was assumed to be the amplitude of the signal. This procedure was followed for all of the finite digitized signals tested.

The results are shown in FIG. 10, where curve 1010 represents the results of MLE and curve 1012 represents the results of FFT. Clearly, the variability in calculated amplitude using the MLE technique, as a function of the number of samples used in the digitized signal, is much smaller than the variability when using the FFT technique. Curve 1010 provides an average amplitude value of 0.998 and a standard deviation of 0.0034, whereas curve 1012 provides an average amplitude value of 0.8715 and a standard deviation of 0.1104. Although the FFT technique can produce accurate results, as evidenced by peaks in the curve 1012 occurring at values close to 1, it can also produce substantially inaccurate results, as evidenced by the peaks occurring at values below 0.7, for example. Variability of the MLE curve 1010 is comparatively much smaller. Moreover, as the number of samples increases, the variability of curve 1010 decreases (accuracy increases), whereas the variability of curve 1012 remains substantially the same.

FIGS. 11a-b investigate the effect of signal phase for a fixed number of sample points. Thus, these figures show the calculated amplitude of a single frequency signal, representative of a component of a response signal, as a function of the phase of the signal, where graph 11a shows the amplitude calculated using FFT and graph 11b shows the amplitude calculated using MLE. For purposes of these graphs, again a signal of unit amplitude and 40 kHz frequency was assumed. The signal was digitized at a 500 kHz sampling rate. From this digitized signal we produced a sequence of finite digitized signals, all having 256 sample points (representing a total sample time of 512 microseconds) and differing from each other only by the phase $\phi$ of the signal, with the phase ranging from 0 to $\pi$ radians. Each of these finite digitized signals was evaluated in the same manner described for FIG. 10, using the same FFT and MLE methodologies, and the results are shown in FIGS. 11a and 11b. One can readily observe the relative insensitivity of the MLE technique to the phase of the signal, evidenced by the small variability in the curve of FIG. 11b, relative to that of the FFT technique. Note also that the signal amplitude calculated by FFT is substantially different from the true signal amplitude of 1.0. This is a consequence of the variability of FFT with sample number (see FIG. 10) in combination with the particular number of samples chosen for this comparison.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:
1. A touch-sensitive apparatus, comprising:
a panel comprising a touch surface, a plurality of drive electrodes, and a plurality of receive electrodes;
a drive unit configured to deliver a first drive signal having a first drive frequency to a first one of the drive electrodes while also delivering a second drive signal having a second drive frequency, different from the first drive frequency, to a second one of the plurality of drive electrodes; and
a measurement unit configured to receive a first response signal from a first one of the plurality of receive electrodes, and to analyze the first response signal to determine therefrom (a) a first coupling capacitance between the first receive electrode and the first drive electrode using a maximum likelihood estimation for a square of a first amplitude at a first frequency associated with the first drive frequency using a probability density function of the first amplitude and at least one amplitude of the first response signal, and (b) a second coupling capacitance between the first receive electrode and the second drive electrode using a maximum likelihood estimation for a square of a second amplitude at a second frequency associated with the second drive frequency using a probability density function of the second amplitude and the at least one amplitude of the first response signal.
2. The apparatus of claim 1, wherein the measurement unit is configured to evaluate the first response signal over a first sample time, the first sample time corresponding to a first integer number of periods of the first drive frequency and also corresponding to a second integer number of periods of the second drive frequency.

3. The apparatus of claim 2, wherein the first and second drive signals are a subset of a plurality of drive signals, each having a different drive frequency and each delivered to a different one of the drive electrodes respectively, and wherein the first sample time corresponds to different integer numbers of periods of each of the different drive frequencies.

4. The apparatus of claim 3, wherein the drive frequencies of the plurality of drive signals exhibit a uniform frequency spacing of $\Delta f$.

5. The apparatus of claim 3, wherein the drive frequencies of the plurality of drive signals have a greatest common factor of $f_{GCF}$, and wherein the first sample time is substantially the reciprocal of $f_{GCF}$ or an integer multiple thereof.

6. The apparatus of claim 3, wherein the plurality of drive signals comprises at least four drive signals.

7. The apparatus of claim 1, wherein the measurement unit is further configured to filter, amplify, and/or digitize the first response signal.

8. The apparatus of claim 1, wherein the measurement unit is also configured to receive a second response signal from a second one of the plurality of receive electrodes, and to analyze the second response signal to determine therefrom (c) a third coupling capacitance between the second receive electrode and the first drive electrode using a maximum likelihood estimation for a square of a third amplitude at the first frequency using a probability density function of the third amplitude and at least one amplitude of the second response signal, and (d) a fourth coupling capacitance between the second receive electrode and the second drive electrode using a maximum likelihood estimation for a square of a fourth amplitude at the second frequency using a probability density function of the fourth amplitude and at least one amplitude of the second response signal.

9. The apparatus of claim 8, wherein the first and second response signals are a subset of a plurality of response signals associated respectively with a corresponding plurality of receive electrodes.

10. The apparatus of claim 1, wherein the plurality of drive electrodes and the plurality of receive electrodes define an electrode matrix, each drive electrode being capacitively coupled to each receive electrode at a respective node of the matrix, the panel being configured such that a touch on the touch surface proximate a given one of the nodes changes a coupling capacitance between the drive electrode and the receive electrode associated with the given node.

11. The apparatus of claim 1, wherein the drive unit is further configured to deliver a third drive signal, having a third drive frequency different from the first and second drive frequencies, to a third one of the drive electrodes while also delivering the first drive signal to the first drive electrode and the second drive signal to the second drive electrode.

12. The apparatus of claim 1, wherein the drive unit comprises a first multiplexer configured to couple the first drive signal sequentially to the first drive electrode and at least another one of the plurality of drive electrodes.

13. The apparatus of claim 1, wherein the drive unit has a first operating mode in which the first drive signal is delivered at overlapping times to the first drive electrode and at least another one of the plurality of drive electrodes, the drive unit also having a second operating mode in which the first drive signal is delivered individually to the first drive electrode and the another drive electrode in a timed sequence.

14. The apparatus of claim 1, wherein the first drive signal has a first phase, and wherein the measurement unit is configured to analyze the first response signal to determine therefrom the first coupling capacitance and the second coupling capacitance without regard to the first phase.

15. The apparatus of claim 1, wherein the measurement unit includes a first band-pass filter coupleable to the first response signal to isolate a signal component at the first drive frequency from the first response signal, the signal component at the first drive frequency being responsive to the first coupling capacitance.

16. The apparatus of claim 15, wherein the measurement unit also includes a second band-pass filter coupleable to the first response signal to isolate a signal component at the second drive frequency from the first response signal, the signal component at the second drive frequency being responsive to the second coupling capacitance.

17. The apparatus of claim 1, further comprising:
a control unit coupled to the drive unit and to the measurement unit, the control unit configured to control the first and second drive frequencies delivered by the drive unit, the control unit also configured to provide the first and second drive frequencies to the measurement unit such that the maximum likelihood estimation implemented by the measurement unit analyzes the first response signal based on the first and second drive frequencies.

18. A method of determining a plurality of touch locations for touches on a touch panel that are simultaneous or overlapping in time, the method comprising:
providing a panel comprising a touch surface, a plurality of drive electrodes, and a plurality of receive electrodes;
delivering a first drive signal having a first drive frequency to a first one of the drive electrodes while also delivering a second drive signal having a second drive frequency, different from the first drive frequency, to a second one of the plurality of drive electrodes;
receiving a first response signal from a first one of the plurality of receive electrodes;
analyzing the first response signal to determine therefrom (a) a first coupling capacitance between the first receive electrode and the first drive electrode using a maximum likelihood estimation of a square of a first amplitude at a first frequency associated with the first drive frequency using a probability density function of the first amplitude and at least one amplitude of the first response signal, and (b) a second coupling capacitance between the first receive electrode and the second drive electrode using a maximum likelihood estimation of a square of a second amplitude at a second frequency associated with the second drive frequency using a probability density function of the second amplitude and the at least one amplitude of the first response signal.

19. The method of claim 18, wherein the analyzing includes evaluating the first response signal over a first sample time, the first sample time corresponding to a first integer number of periods of the first drive frequency and also corresponding to a second integer number of periods of the second drive frequency.

20. The method of claim 18, wherein the first drive signal is controlled to oscillate at the first drive frequency based on a first control value, wherein the first response signal is initially in analog form, wherein the analyzing includes digitizing the first response signal at a sampling frequency, and wherein the analyzing includes determining the first coupling capacitance by calculating a first amplitude of a first component of the digitized first response signal using the first control value.

\* \* \* \* \*